(12) United States Patent
Matsuda

(10) Patent No.: US 12,313,564 B2
(45) Date of Patent: May 27, 2025

(54) INSPECTION DEVICE AND INSPECTION METHOD

(71) Applicant: TOYOTA JIDOSHA KABUSHIKI KAISHA, Toyota (JP)

(72) Inventor: Tomohiro Matsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 400 days.

(21) Appl. No.: 17/829,524

(22) Filed: Jun. 1, 2022

(65) Prior Publication Data

US 2023/0036062 A1  Feb. 2, 2023

(30) Foreign Application Priority Data

Jul. 29, 2021  (JP) ................................. 2021-123933

(51) Int. Cl.
*G06T 7/00* (2017.01)
*G01N 21/88* (2006.01)

(52) U.S. Cl.
CPC ....... *G01N 21/8851* (2013.01); *G06T 7/0006* (2013.01); *G01N 2021/8883* (2013.01); *G01N 2021/8887* (2013.01); *G06T 2207/20081* (2013.01)

(58) Field of Classification Search
CPC ....... G01N 21/8851; G01N 2021/8883; G01N 2021/8887; G06T 7/0006; G06T 2207/20081; G06T 7/0004; G06N 21/88
See application file for complete search history.

(56) References Cited

U.S. PATENT DOCUMENTS

| | | | |
|---|---|---|---|
| 2017/0336775 A1 | 11/2017 | Tokorozuki et al. | |
| 2018/0300865 A1* | 10/2018 | Weiss | G05B 19/41875 |
| 2019/0033839 A1 | 1/2019 | Kuwabara et al. | |
| 2020/0175352 A1* | 6/2020 | Cha | G06N 3/04 |
| 2021/0150700 A1* | 5/2021 | Wang | G06F 18/2415 |
| 2022/0036123 A1* | 2/2022 | Cummings | G06N 20/00 |

FOREIGN PATENT DOCUMENTS

| | | |
|---|---|---|
| JP | 2017-211713 A | 11/2017 |
| JP | 2019-025561 A | 2/2019 |
| JP | 2020-041889 A | 3/2020 |

* cited by examiner

*Primary Examiner* — John Villecco
*Assistant Examiner* — Kyla Guan-Ping Tiao Allen
(74) *Attorney, Agent, or Firm* — Oliff PLC

(57) ABSTRACT

An inspection device includes: a first acquisition unit for acquiring a first defect probability calculated using a first learning model from data regarding an inspection target processed in a first manufacturing process; a second acquisition unit for acquiring a second defect probability calculated using a second learning model from data regarding the inspection target processed in a second manufacturing process after the first manufacturing process; and a determination unit for determining a defect in the inspection target if the acquired second defect probability is greater than or equal to a second threshold value, the determination unit being configured to change at least one of the second learning model and the second threshold value into a condition for enhancing inspection accuracy if the acquired first defect probability is greater than a predetermined first threshold, compared to if the first defect probability is less than or equal to the first threshold value.

4 Claims, 8 Drawing Sheets

INSPECTION DEVICE AND INSPECTION METHOD

CROSS REFERENCE TO RELATED APPLICATIONS

This application is based upon and claims the benefit of priority from the prior Japanese Patent Application No. 2021-123933, filed on Jul. 29, 2021, the content of which is incorporated herein by reference in its entirety.

BACKGROUND

Field

The present disclosure relates to an inspection device and an inspection method.

Related Art

There is a known machining system that includes a machining cell having a processing machine for machining a workpiece and an inspection device for inspecting the workpiece after machining, and a machine learning device connected to the machining cell via a network (see, for example, Japanese Patent Application Publication No. 2019-025561). In the machining system, the determination result of a defect rate of a workpiece provided by the inspection device is transmitted to the machine learning device as inspection result data. The machine learning device uses the inspection result data to perform learning and thus changes the machining condition to minimize the defect rate of the workpiece.

The inspection device is required to have its inspection accuracy improved.

SUMMARY

According to an aspect of the present disclosure, an inspection device is provided. The inspection device includes: a first acquisition unit configured to acquire a first defect probability, wherein the first defect probability is calculated using a first learning model, wherein data regarding an inspection target processed in a first manufacturing process is input into the first learning model; a second acquisition unit configured to acquire a second defect probability, wherein the second defect probability is calculated using a second learning model, wherein data regarding the inspection target processed in a second manufacturing process after the first manufacturing process is input into the second learning model; and a determination unit configured to determine that the inspection target has a defect when the acquired second defect probability is greater than or equal to a second threshold value, the determination unit being configured to change at least one of a condition of the second learning model and a condition of the second threshold value into a condition for enhancing inspection accuracy when the acquired first defect probability is greater than a predetermined first threshold, wherein the condition for enhancing inspection accuracy has higher accuracy compared to when the first defect probability is less than or equal to the first threshold value.

According to the inspection device of this aspect, the inspection condition is changed to the condition for enhancing the inspection accuracy if the first defect probability is greater than the first threshold value. Therefore, the inspection accuracy for a product after the processing in the second manufacturing process can be improved.

DETAILED DESCRIPTION

A. First Embodiment

Figure 1:
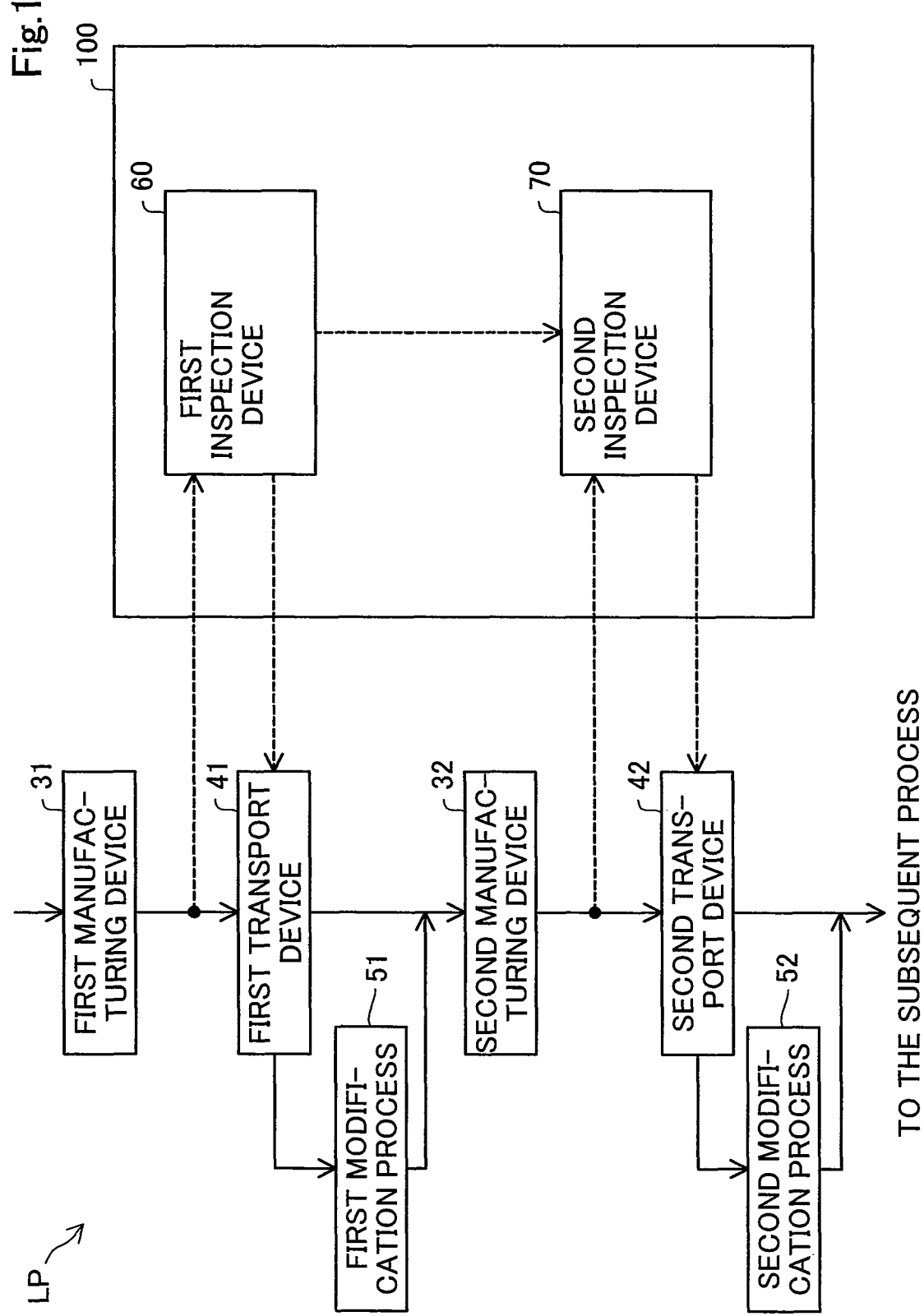
FIG. 1 is an explanatory diagram illustrating an inspection system including an inspection device of a present embodiment.

FIG. 1 is an explanatory diagram illustrating an inspection system 100 including an inspection device of a present embodiment. The inspection system 100 inspects an inspection target subjected to processes included in a manufacturing line LP for the presence or absence of defects. The inspection target means a product that flows in the manufacturing line LP. In the present disclosure, the "processing" means performing a specific operation on a product and includes actions that may affect the properties of the product. For example, even actions other than machining of a product, such as transport of a product, may be included in the "processing" in cases where they may affect the properties of the product.

In the present embodiment, the inspection system 100 includes two inspection devices utilizing machine learning. Specifically, the inspection system 100 includes a first inspection device 60 and a second inspection device 70 which is the inspection device of the present embodiment. The first inspection device 60 inspects products after processing in a first manufacturing process, while the second inspection device 70 inspects products after processing in a second manufacturing process. In the present embodiment, the second inspection device 70 acquires the inspection result provided by the first inspection device 60 and changes a determination condition for determining a defect based on the acquired inspection result.

The manufacturing line LP includes, for example, a first manufacturing device 31 and a second manufacturing device 32, a first transport device 41 and a second transport device 42, a first modification process 51 and a second modification process 52. In an example of FIG. 1, products are processed in the production line LP by the first manufacturing device 31, the first transport device 41, the second manufacturing device 32, and the second transport device 42 in this order.

The first manufacturing device 31 is a device that performs processing on products as the first manufacturing process. The first manufacturing device 31 is, for example, a die casting machine that molds vehicle parts such as cylinder heads and engine blocks. The second manufacturing device 32 is a device that performs processing on products as the second manufacturing process, which is a subsequent process of the first manufacturing process. The second manufacturing device 32 is, for example, a device that performs post-machining or post-processing on the product after casting. A specific example of the second manufacturing device 32 is a device that performs machining, such as a numerically-controlled lathe (NC lathe), or a machining center. The second manufacturing device 32 performs cutting, drilling, threading/tapping, and the like on molded products manufactured by the first manufacturing device 31. The second manufacturing device 32 may be various types of devices that perform not only machining, such as cutting and drilling, but also post-machining and post-processing after molding. The second manufacturing device 32 may be various types of devices that perform processing, such as casting finishing including removal of casting burrs and barrel polishing, finishing including shot blasting and buffing, joining treatment including screw fastening and welding, surface treatment including painting and plating, heat treatment, and impregnation treatment, for example. The first and second manufacturing processes are not limited to processing performed by the respective devices, but may include manual processing by humans.

In the present embodiment, the second manufacturing process is a process that is linked to the first manufacturing process. The phrase "linked to the first manufacturing process" means the relationship in which changes in the properties of a product obtained after the processing in the first manufacturing process may affect the properties of a product obtained after the processing in the second manufacturing process, while excluding the relationship where the first manufacturing process and the second manufacturing process are independent of each other. Specific examples of the cases where the second manufacturing process is linked to the first manufacturing process include a case where the contents of the processing in the second manufacturing process are the same as those in the first manufacturing process, a case where the position where the processing is performed in the second manufacturing process is the same as the position where the processing is performed in the first manufacturing process, a case where the processing in the second manufacturing process is performed following the processing in the first manufacturing process, and the like. In these cases, for example, if the properties of the product change after the processing in the first manufacturing process, the product, after the processing in the second manufacturing process, may have potential defects due to the effects of the change in the properties of the product by the first manufacturing process, even though the product, after the process in the first manufacturing process, has been determined to be a good product by the inspection device. Thus, when the product is expected to have a defect in its property after the processing in the first manufacturing process, the inspection after the processing in the second manufacturing process may not be able to detect such a potential defect without changing the inspection condition or defect determination condition. For example, in a case where an inspection device using machine learning is utilized to inspect products after the processing in the second manufacturing process, the inspection device must learn about this potential defect sufficiently. However, it is difficult to sort out products with potential defects, and it is also difficult to cause the inspection device to perform sufficient machine learning. In the present disclosure, the improvement in the inspection accuracy includes an improvement in the calculation accuracy for the defect probability calculated using data regarding an inspection target, and an improvement in the detection accuracy for potential defects.

The first transport device 41 and the second transport device 42 transport products, parts, workpieces, or the like that are subject to processing by the first manufacturing device 31 and the second manufacturing device 32, respectively. The first transport device 41 and the second transport device 42 may include, for example, a conveyor belt, a conveying machine that moves on a track, and the like. The first transport device 41 transports products after the processing performed by the first manufacturing device 31. In the present embodiment, the initial setting of the transport route by means of the first transport device 41 is a route from the first manufacturing process to the second manufacturing process. The first transport device 41 switches the product transport route to a route that leads from the first manufacturing process to the first modification process 51, based on the inspection result provided by the first inspection device 60, indicating whether the product after the processing in the first manufacturing process has a defect or not. The second transport device 42 transports products after the processing performed by the second manufacturing device 32. In the present embodiment, the initial setting of the transport route by means of the second transport device 42 is a route from the second manufacturing process to its subsequent process. To this end, the second transport device 42 switches the product transport route to a route that leads from the second manufacturing process to the second modification process 52 based on the inspection result provided by the second inspection device 70, indicating whether the product after the processing in the second manufacturing process has a defect or not.

The first modification process 51 is performed when a product is determined to have a defect after the processing performed by the first manufacturing device 31. The first modification process 51 involves removing the defect from the product after the processing in the first manufacturing process and dispatching normal products to the second manufacturing device 32. The second modification process 52 is performed when a product is determined to have a defect after the processing performed by the second manufacturing device 32. The second modification process 52 involves removing the defect from the product after the processing in the second manufacturing process and dispatching normal products to the subsequent process. The removal of defects in the first modification process 51 and the second modification process 52 may be performed by a dedicated device or manually by the operator.

Figure 2:
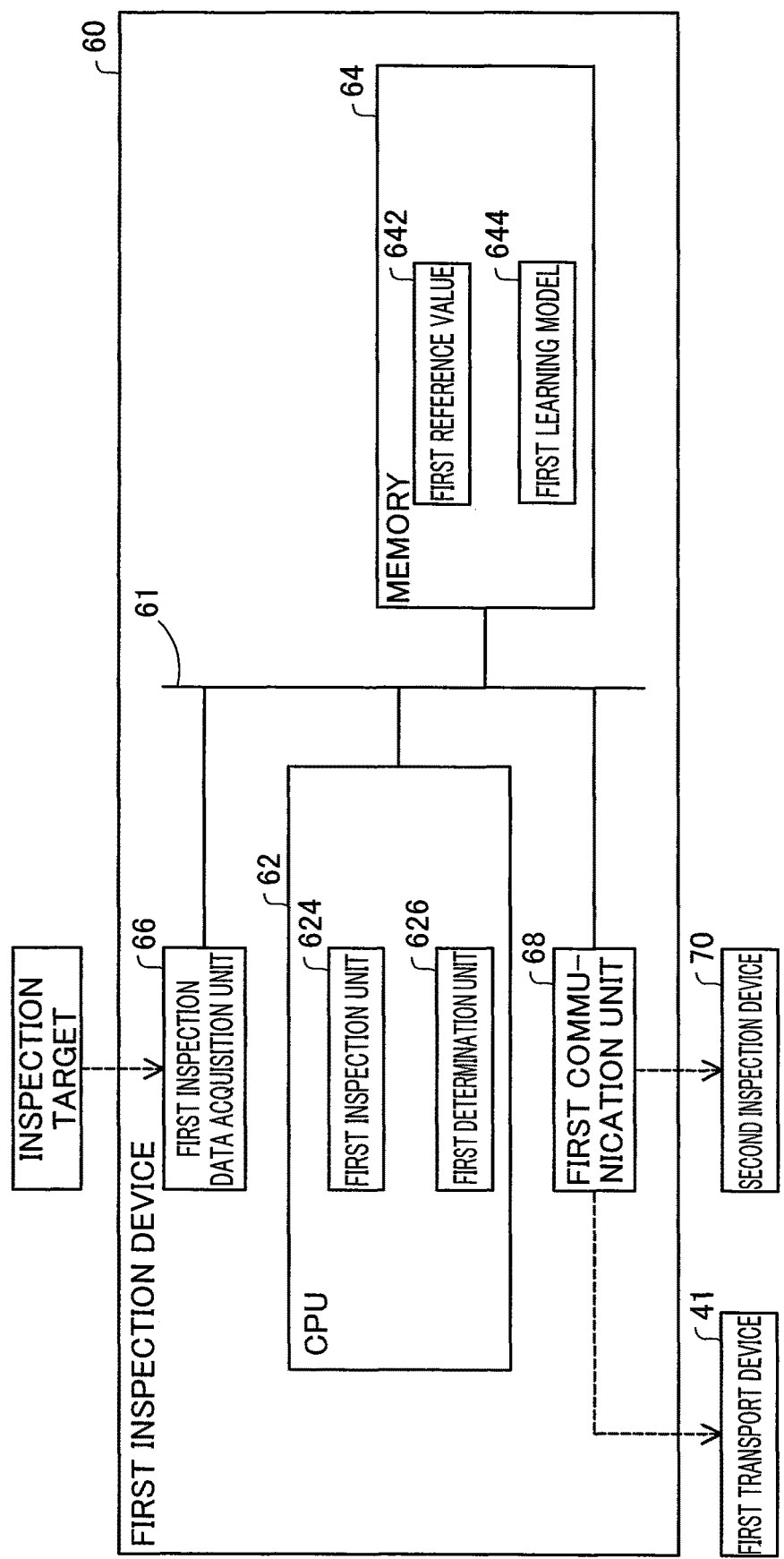
FIG. 2 is a block diagram illustrating an internal functional configuration of a first inspection device.

FIG. 2 is a block diagram illustrating an internal functional configuration of the first inspection device 60. The first inspection device 60 determines whether an inspection target has a defect or not by using image data on the inspection target. The first inspection device 60 includes a central processing unit (CPU) 62, a storage device 64, a first inspection data acquisition unit 66, and a first communication unit 68. The CPU 62, the storage device 64, the first inspection data acquisition unit 66, and the first communication unit 68 are connected to each other via a bus 61 and can communicate in both directions. The CPU 62 functions as a first inspection unit 624 and a first determination unit 626 by executing various programs stored in the storage device 64.

The storage device 64 is, for example, a RAM, a ROM, and a hard disk drive (HDD). The HDD (or ROM) stores various programs for realizing the functions provided in the present embodiment. Various programs read from the HDD are expanded on the RAM and executed by the CPU 62. The storage device 64 stores a first reference value 642 and a first learning model 644 that are used to determine whether the inspection target has a defect or not. The storage device 64 temporarily stores a first defect probability calculated by the first inspection unit 624.

The first inspection data acquisition unit 66 acquires data regarding the inspection target to be used for inspection. In the present embodiment, the first inspection data acquisition unit 66 is a camera for capturing an image of a product after the processing performed by the first manufacturing device 31. The first inspection data acquisition unit 66 is installed in the transport route for transporting the inspection target after the processing performed by the first manufacturing device 31 and acquires an image of the inspection target by capturing the image of the inspection target during transport. In the present embodiment, the image acquired by the first inspection data acquisition unit 66 is constituted of an RGB input image signal that is composed of respective image signal components, represented by R (red), G (green), and B (blue). The input image signal may be, for example, a YUV image signal composed of Y (luminance signal), U (first color difference signal), and V (second color difference signal), a YCbCr image signal, or a YPbPr image signal. The image may be a color image, or a grayscale image with luminance values of any color depth, such as 1-bit or 8-bit.

The first inspection unit 624 calculates a defect probability of the inspection target utilizing machine learning. The defect probability means the probability that the inspection target has a defect. The machine learning may use any categories of machine learning, including supervised learning, unsupervised learning, reinforcement learning, and the like. In the present embodiment, the first inspection unit 624 utilizes statistical machine learning and inspects the inspection target using the first learning model 644. The first learning model 644 is a discriminative model of a neural network. The first learning model 644 is a Convolutional Neural Network (CNN). The first learning model 644 is not limited to the CNN, but may use discriminative models and generative models of various neural networks, such as a Generative Adversarial Network (GAN), a Variational Autoencoder (VAE), and an autoregressive generative network. The first learning model 644 has already completed learning using images of normal products as well as images of products having defects after the processing performed by the first manufacturing device 31. In the present embodiment, the first inspection unit 624 inputs data on the inspection target, which has been acquired by the first inspection data acquisition unit 66, into the first learning model 644 and then calculates the first defect probability by using, for example, a sigmoid function or Softmax function. The first defect probability means the probability that the inspection target after the processing in the first manufacturing process has a defect. The calculated first defect probability is transmitted to the second inspection device 70 by the first communication unit 68 as mentioned later.

The first determination unit 626 uses the first defect probability calculated by the first inspection unit 624 to determine whether the inspection target has a defect or not. In the present embodiment, the first determination unit 626 determines whether the inspection target has a defect or not by comparing the first defect probability with the first reference value 642 that has been set to be an arbitrary value. The first reference value 642 is a determination condition for use in determining whether the inspection target has a defect or not. It is previously set to an arbitrary value. In the present embodiment, the first reference value 642 is set to 2.0%.

The first communication unit 68 transmits the first defect probability of the inspection target calculated by the first inspection unit 624 to the second inspection device 70 via wireless communication. The first communication unit 68 further transmits an execution order for switching the transport route to the first transport device 41 in the manufacturing line LP. Examples of the wireless communication suitable for use include wireless communication through a wireless local network (LAN) using 2.4 GHz band or 5 GHz band in compliance with IEEE802.11a standards, wireless communication using a sub-GHz band which is a frequency band of less than 1 GHz (916.5 MHz to 927.5 MHz), and wireless communication using Bluetooth (registered trademark). The first communication unit 68 may be connected to the first transport device 41 and the second inspection device 70 through a wired LAN such as Ethernet (registered trademark).

Figure 3:
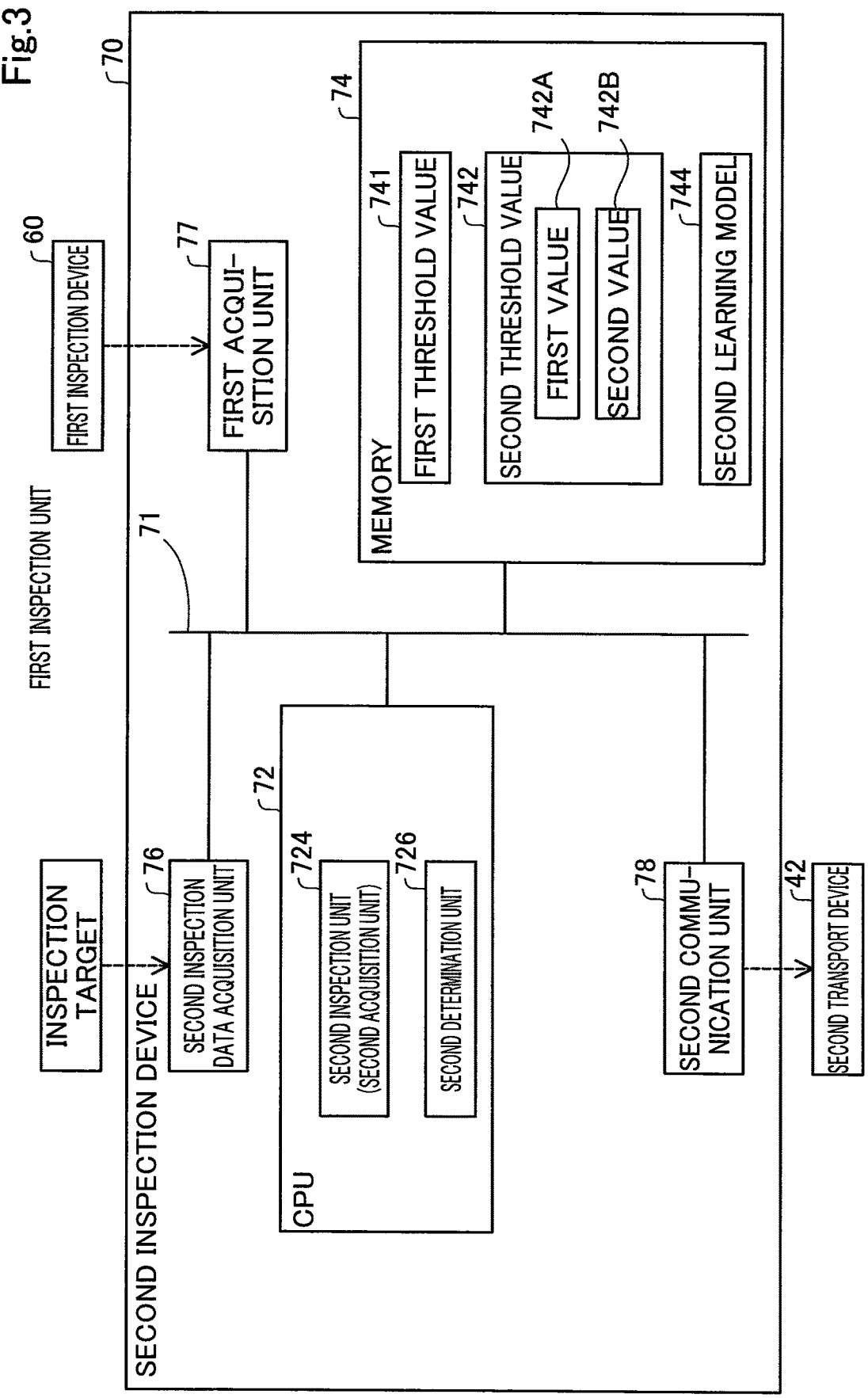
FIG. 3 is a block diagram illustrating an internal functional configuration of a second inspection device.

FIG. 3 is a block diagram illustrating an internal functional configuration of the second inspection device 70. The second inspection device 70 determines whether the inspection target has a defect or not, by using image data on the inspection target. The second inspection device 70 includes a central processing unit (CPU) 72, a storage device 74, a second inspection data acquisition unit 76, a first acquisition unit 77, and a second communication unit 78. The CPU 72, the storage device 74, the second inspection data acquisition unit 76, the first acquisition unit 77, and the second communication unit 78 are connected to each other via a bus 71 and can communicate in both directions. The first acquisition unit 77 acquires the first defect probability transmitted from the first inspection device 60 thereto via the first communication unit 68.

The CPU 72 functions as a second inspection unit 724 and a second determination unit 726 by executing various programs stored in the storage device 74. The storage device 74 is, for example, a RAM, a ROM, and a hard disk drive (HDD). The HDD (or ROM) stores various programs for realizing the functions provided in the present embodiment. Various programs read from the HDD are expanded on the RAM and executed by the CPU 72. The storage device 74 stores a first threshold value 741 used to determine whether to change the inspection condition of the second inspection unit 724 or the determination condition of the second determination unit 726, a second threshold value 742 used to determine whether the inspection target has a defect or not, and a second learning model 744. The storage device 74 temporarily stores a second defect probability calculated by the second inspection unit 724 and the first defect probability acquired by the first acquisition unit 77.

The second inspection data acquisition unit 76 acquires data regarding the inspection target to be used for inspection. In the present embodiment, the second inspection data acquisition unit 76 is a camera for capturing an image of the product after the processing performed by the second manufacturing device 32. The second inspection data acquisition unit 76 is installed in the transport route for transporting the inspection target after the processing performed by the second manufacturing device 32 and acquires an image of the inspection target by capturing the image of the inspection target during transport. The other components of the second inspection data acquisition unit 76 are the same as those of the first inspection data acquisition unit 66, and thus their description will be omitted.

The second inspection unit 724 functions as a second acquisition unit that calculates a second defect probability and acquires the second defect probability. The second defect probability means the probability that the inspection target after the processing in the second manufacturing process has a defect. The second defect probability is calculated by using the second learning model 744 on data regarding the inspection target processed in the second manufacturing process. In the present embodiment, the second inspection unit 724 calculates and acquires the second defect probability utilizing machine learning. The machine learning may use any categories of machine learning, including supervised learning, unsupervised learning, reinforcement learning, and the like. In the present embodiment, the second inspection unit 724 utilizes statistical machine learning. The second learning model 744 is a discriminative model of a neural network. In the present embodiment, the second learning model 744 is a CNN. Specifically, the second learning model 744 employs the CNN with a VGG16. The VGG16 is a neural network with 13 convolutional layers and 3 fully connected layers. The second learning model 744 is not limited to the CNN, but may use discriminative models and generative models of various neural networks, such as a Generative Adversarial Network (GAN), a Variational Autoencoder (VAE), and an autoregressive generative network. The second learning model 744 has already completed learning using images of normal products and images of products having defects after the processing performed by the second manufacturing device 32. In the present embodiment, the second inspection unit 724 inputs data on the inspection target, which has been acquired by the second inspection data acquisition unit 76, into the second learning model 744 and then calculates the second defect probability by using, for example, the sigmoid function or Softmax function.

The second determination unit 726 uses the second defect probability to determine whether the inspection target has a defect or not. The second determination unit 726 switches the determination condition for determining whether the inspection target has a defect or not based on the result of the first defect probability acquired by the first acquisition unit 77. In the present embodiment, the second determination unit 726 determines which one of a first value 742A and a second value 742B is used as the second threshold value 742 of the determination condition by comparing the first defect probability and the first threshold value 741. Specifically, if the acquired first defect probability is greater than the first threshold value 741, the second threshold value 742 is changed from the first value 742A to the second value 742B.

The first threshold value 741 is a threshold value for the second determination unit 726 to determine whether or not to change the determination condition. The first threshold value 741 is previously set to an arbitrary value smaller than the first reference value 642. In the present embodiment, the first threshold value 741 is set to half of the first reference value 642, i.e., 1.0%. If the first defect probability is greater than the first threshold value 741 and smaller than the first reference value 642, the product, after the processing in the first manufacturing process, is determined to have no defect by the first inspection device 60. However, in such a case, the product, after the processing in the second manufacturing process, may have a potential defect due to the effects of the change in the properties of the product by the first manufacturing process. The second inspection device 70 of the present embodiment determines whether the product, after the processing in the second manufacturing process, may have a potential defect or not due to the effects of the change in the properties of the product by the first manufacturing process, depending on whether the first defect probability is greater than the first threshold value 741. The first threshold value 741 is not limited to half of the first reference value 642, but may be set to any appropriate value in consideration of the effects on products in the second manufacturing process and it may be, for example, one-fourth, one-third, etc., of the first reference value 642.

The second threshold value 742 is a determination condition for use in determining whether the inspection target has a defect or not. It is previously set to an arbitrary value. In the present embodiment, as the second threshold value 742, the normally used first value 742A and the second value 742B used when the second determination unit 726 changes its determination condition, are previously set. The first value 742A is set to 2.0%. Compared to the first value 742A, the second value 742B is set to a value smaller than the first value 742A from the viewpoint of improving inspection accuracy. In the present embodiment, the second value 742B is set to 0.5%.

The second determination unit 726 uses the second defect probability calculated by the second inspection unit 724 and the second threshold value 742 to determine whether the inspection target has a defect or not. In the present embodiment, the second determination unit 726 determines whether the inspection target has a defect or not by comparing the second defect probability and the second threshold value 742 as the first value 742A, or by comparing the second defect probability and the second threshold value 742 as the second value 742B, according to the determination condition determined based on the first defect probability.

The second communication unit 78 transmits an execution order for switching the transport route to the second transport device 42 in the manufacturing line LP via wireless communication. The other components of the second communication unit 78 are the same as those of the first communication unit 68, and thus their description will be omitted.

Figure 4:
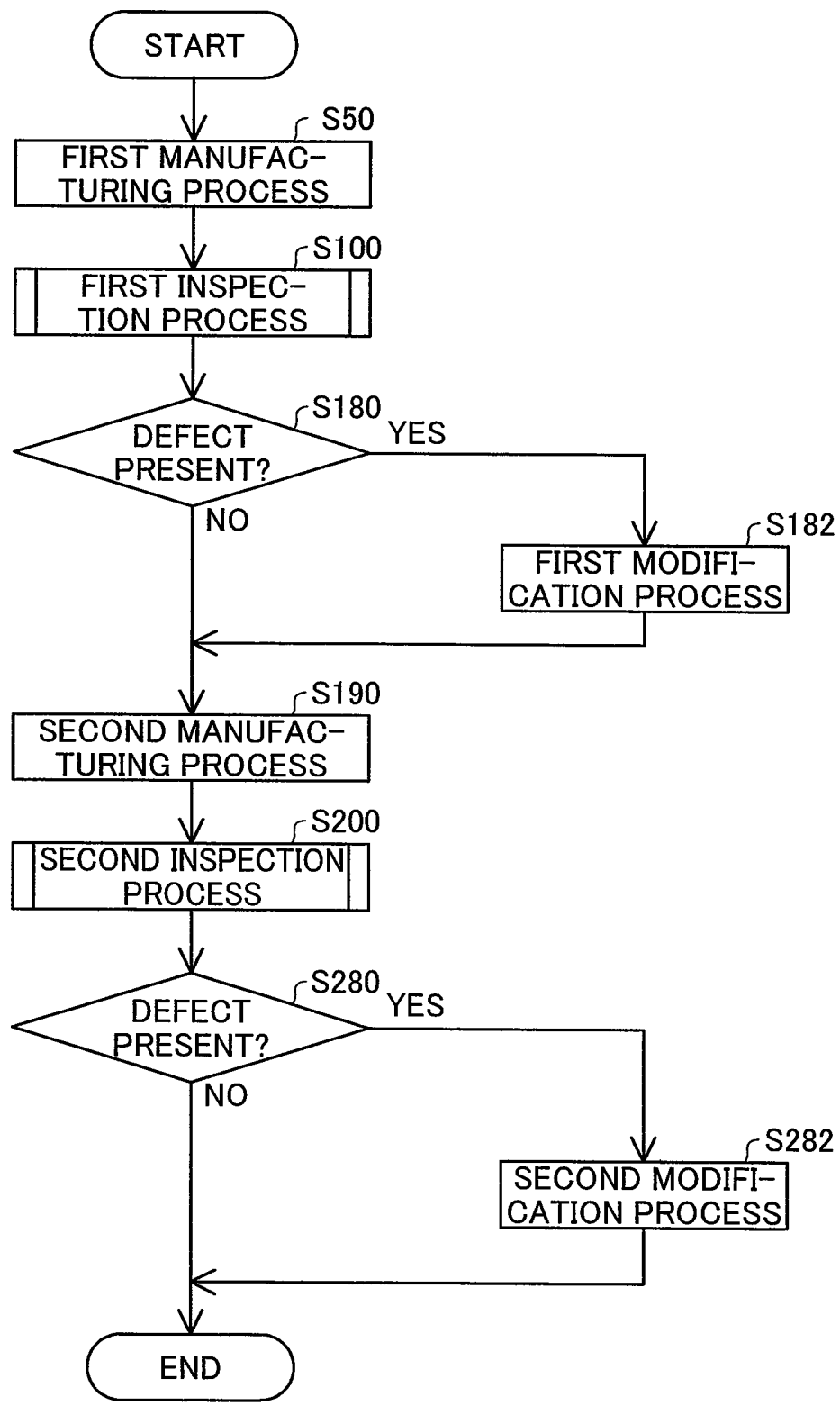
FIG. 4 is a process diagram illustrating each process in a manufacturing line.

FIG. 4 is a process diagram illustrating each process in the manufacturing line LP. In step S50, processing is performed on a product in the first manufacturing process. In the present embodiment, a die casting machine as the first manufacturing device 31 forms products as vehicle parts.

In step S100, the product is inspected in the first inspection process. In the first inspection process, the first inspection device 60 calculates the first defect probability and determines whether there is a defect or not for the product after the processing performed by the first manufacturing device 31. The calculated first defect probability is output to the second inspection device 70 in correspondence with the serial number of the product, etc.

In step S180, it is determined whether or not to switch a dispatching destination of the product depending on the inspection result of the product in the first inspection process. In the present embodiment, if the first inspection device 60 determines that the product has a defect in the first inspection process (S180: YES), the first inspection device 60 transmits a command signal for switching the transport route of the first transport device 41 to the first transport device 41. As a result, the product that has been determined to have a defect is dispatched to the first modification process in step S182. If the first inspection device 60 determines that the product has no defect in the first inspection step (S180: NO), the first inspection device 60 does not output any command signal to the first transport device 41. As a result, the product is dispatched to the second manufacturing process in step S190.

In step S182, processing for removing the defect from the product is performed as the first modification process.

Examples of removing defects from products in the present embodiment include removing casting burrs (Flash) from products after casting, filling in blowholes (Porosity), and the like. As a result, the products, after the processing is performed by the first manufacturing device 31 to remove defects, are dispatched to the second manufacturing device 32 as normal products. Step S182 may be omitted, for example, if products are discarded when they are determined to have defects.

In step S190, processing is performed on the product in the second manufacturing process. In the present embodiment, post-machining such as cutting and drilling of products after casting is performed by a machining device as the second manufacturing device 32.

In step S200, the product is inspected in the second inspection process. In the second inspection process, the second inspection device 70 calculates the second defect probability and determines whether there is a defect or not for the product after the processing performed by the second manufacturing device 32.

In step S280, it is determined whether or not to switch a dispatching destination of the product depending on the inspection result of the product in the second inspection process. In the present embodiment, if the second inspection device 70 determines that the product has a defect in the second inspection process (S280: YES), the second inspection device 70 transmits to the second transport device 42 a command signal for switching the transport route of the second transport device 42. As a result, the product that has been determined to have a defect is dispatched to the second modification process in step S282. If the second inspection device 70 determines that the product has no defect in the second inspection step (S280: NO), the second inspection device 70 does not output any command signal to the second transport device 42, and the present process is ended.

In step S282, processing for removing the defect from the product is performed as the second modification process. An example of removing defects from products in the present embodiment is additional machining. As a result, the products after the processing is performed by the second manufacturing device 32 to remove defects are dispatched to the subsequent process as normal products. Step S282 may be omitted, for example, if products are discarded when they are determined to have defects.

Figure 5:
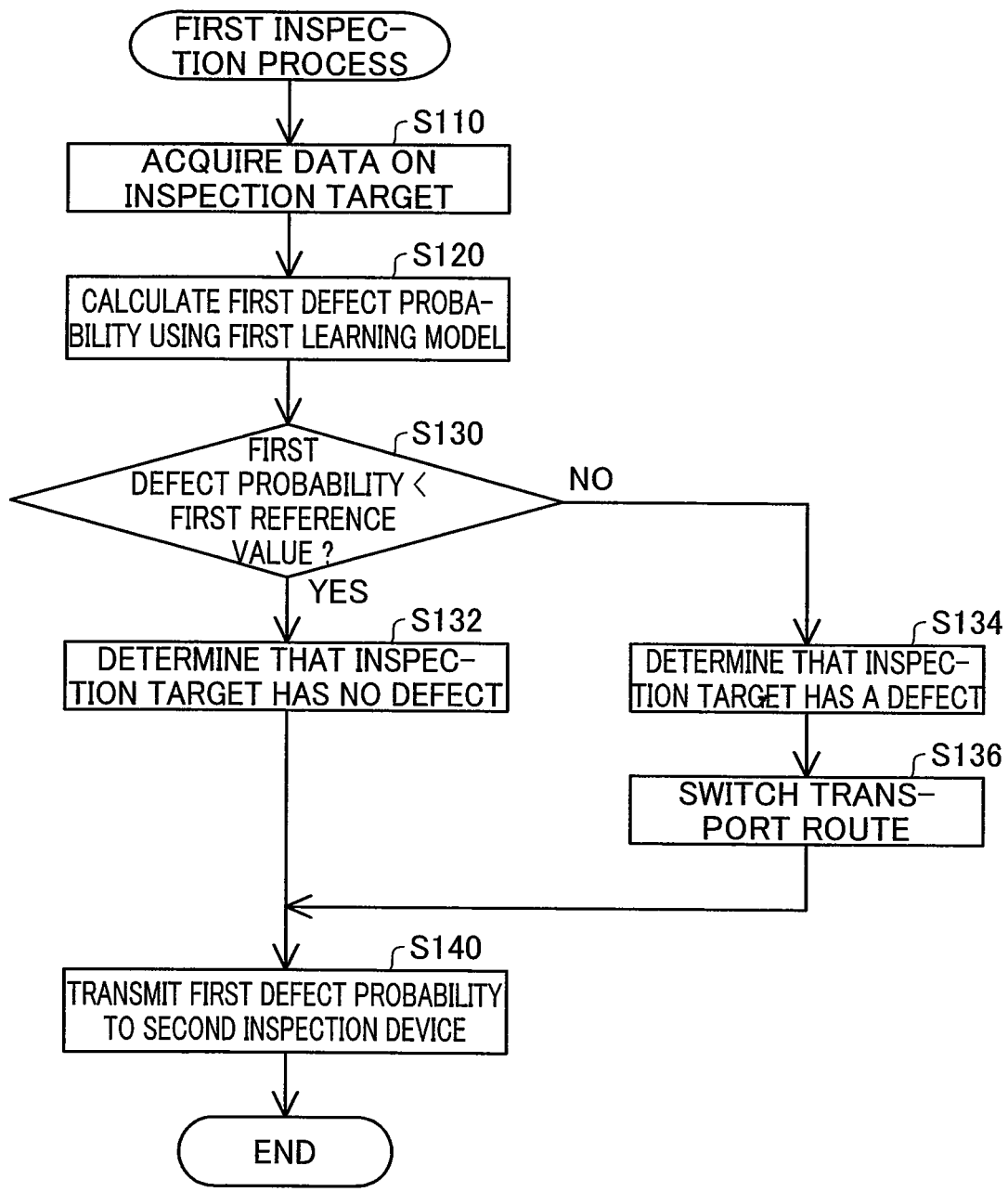
FIG. 5 is a process diagram illustrating the details of a first inspection process performed by the first inspection device.

FIG. 5 is a process diagram illustrating the details of the first inspection process performed by the first inspection device 60. In step S110, the first inspection data acquisition unit 66 acquires data to be used for inspection. In the present embodiment, the camera as the first inspection data acquisition unit 66 captures an image of a product, thereby acquiring image data on the product after the processing performed by the first manufacturing device 31.

In step S120, the first inspection unit 624 calculates the first defect probability by inputting the acquired image data into the first learning model 644. In step S130, the first determination unit 626 uses the first defect probability calculated by the first inspection unit 624 and the first reference value 642 stored in the storage device 64 to determine whether the inspection target has a defect or not. In the present embodiment, the first reference value 642 is set to 2.0%. If the first defect probability is less than 2.0% (S130: YES), the operation proceeds to step S132, in which the first determination unit 626 determines that the inspection target has no defect. If the first defect probability is greater than or equal to 2.0% (S130: NO), the operation proceeds to step S134, in which the first determination unit 626 determines that the inspection target has a defect. In step S136, the first determination unit 626 transmits to the first transport device 41, via the first communication unit 68, a command signal for switching the transport route to a route for dispatching the product to the first modification process. The first determination unit 626 proceeds to step S140 after finishing the processing in step S132 or S136. In step S140, the first determination unit 626 transmits to the second inspection device 70, via the first communication unit 68, the first defect probability calculated in step S120. After the transmission of the first defect probability, the first inspection process is ended.

Figure 6:
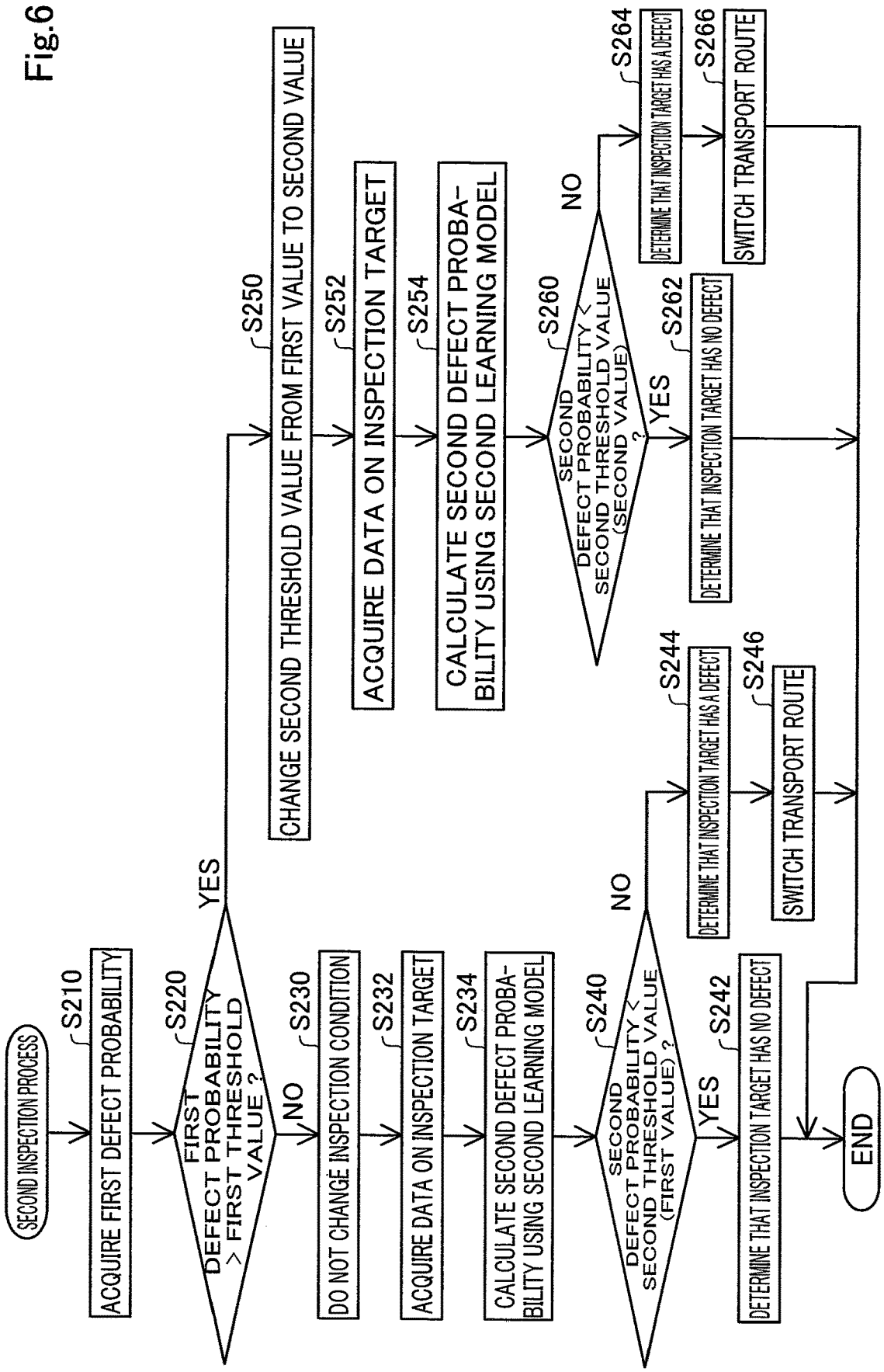
FIG. 6 is a process diagram illustrating the details of a second inspection process performed by the second inspection device.

FIG. 6 is a process diagram illustrating the details of the second inspection process performed by the second inspection device 70. In step S210, the first acquisition unit 77 acquires the first defect probability transmitted from the first inspection unit 624 thereto via wireless communication. The first defect probability acquired by the first acquisition unit 77 is a first defect probability in correspondence with the serial number or the like of the product inspected by the second inspection device 70 in this flow. In step S220, the second determination unit 726 compares the acquired first defect probability with the first threshold value 741 stored in the storage device 74. The first threshold value 741 is set to 1.0%. If the acquired first defect probability is less than or equal to the first threshold value 741 (S220: NO), the operation proceeds to step S230 in which the determination condition for determining whether the inspection target has a defect or not is not changed, and the operation then proceeds to step S232.

In step S232, the second inspection data acquisition unit 76 acquires data to be used for inspection. In the present embodiment, the camera as the second inspection data acquisition unit 76 captures an image of the product, thereby acquiring image data on the product after the processing performed by the second manufacturing device 32. In step S234, the second inspection unit 724 calculates the second defect probability by inputting the acquired image data into the second learning model 744.

In step S240, the second determination unit 726 uses the second defect probability calculated by the second inspection unit 724 and the first value 742A stored in the storage device 74 as the second threshold value 742 to determine whether the inspection target has a defect or not. In the present embodiment, the first value 742A is set to 2.0%. If the second defect probability is less than 2.0% (S240: YES), the operation proceeds to step S242, in which the second determination unit 726 determines that the inspection target has no defect.

If the second defect probability is greater than or equal to 2.0% (S240: NO), the operation proceeds to step S244, in which the second determination unit 726 determines that the inspection target has a defect. In step S246, the second determination unit 726 transmits to the second transport device 42, via the second communication unit 78, a command signal for switching the transport route to a route for dispatching the product to the second modification process. After the processing in step S242 or step S246 is finished, the second inspection process is ended.

If the acquired first defect probability is greater than the first threshold value 741 (S220: YES) in step S220, the operation proceeds to processing in step S250. In step S250, the second determination unit 726 changes the determination condition for determining whether the inspection target has a defect or not. Specifically, the second threshold value 742 is changed from the first value 742A to the second value 742B. It is noted that in the present embodiment, the case of changing the first value 742A to the second value 742B corresponds to a case in which the first defect probability is greater than the first threshold value 741 and smaller than the first reference value 642 because of the relationship with step S130.

In step S252, the second inspection data acquisition unit 76 acquires data to be used for inspection. In the present embodiment, the camera as the second inspection data acquisition unit 76 captures an image of the product, thereby acquiring the image of the inspection target after the processing performed by the second manufacturing device 32. In step S254, the second inspection unit 724 calculates a second defect probability by inputting the acquired image data into the second learning model 744.

In step S260, the second determination unit 726 uses the second defect probability calculated by the second inspection unit 724 and the second value 742B stored in the storage device 74 as the second threshold value 742 to determine whether the inspection target has a defect or not. In the present embodiment, the second value 742B is set to 0.5%. If the second defect probability is less than 0.5% (S260: YES), the operation proceeds to step S262, in which the second determination unit 726 determines that the inspection target has no defect.

If the second defect probability is greater than or equal to 0.5% (S260: NO), the operation proceeds to step S264, in which the second determination unit 726 determines that the inspection target has a defect. In step S266, the second determination unit 726 transmits to the second transport device 42, via the second communication unit 78, a command signal for switching the transport route to a route for dispatching the product to the second modification process. After the second determination unit 726 finishes the processing in step S262 or step S266, the second inspection process is ended.

As described above, the second inspection device 70 of the present embodiment includes: the first acquisition unit 77 that acquires the first defect probability of the inspection target processed in the first manufacturing process; the second inspection unit 724 that calculates the second defect probability using the second learning model 744 on the inspection target processed in the second manufacturing process; and the second determination unit 726 that determines that the inspection target has a defect if the second defect probability is greater than or equal to the second threshold value 742. If the acquired first defect probability is greater than the predetermined first threshold value 741, the second determination unit 726 changes the second threshold value 742 from the first value 742A to the second value 742B, thereby enhancing the inspection accuracy. The determination condition at the second inspection device 70 is changed to the condition for enhancing the inspection accuracy in a case where the product, after the processing in the second manufacturing process, may have a potential defect due to the effects of the first manufacturing process. Therefore, the possibility of detecting any potential defect from products after the processing in the second manufacturing process may be enhanced by improving the inspection accuracy of the second inspection device 70. In addition, the detection accuracy can be improved efficiently while reducing the effects on productivity by changing the condition only when the product, after the processing in the second manufacturing process, may have a potential defect due to the first manufacturing process.

According to the second inspection device 70 of the present embodiment, the second determination unit 726 changes the second threshold value 742 to the second value 742B that is smaller than the first value 742A if the acquired first defect probability is greater than the first threshold value 741. In the case where a product, after the processing in the second manufacturing process, may have a potential defect due to the first manufacturing process, the determination condition for defects in the second determination unit 726 is set stricter, thereby making it possible to reduce or avoid a problem in which the second inspection device 70 misses the potential defect in the product obtained after the processing in the second manufacturing process, and thus improving inspection accuracy.

B. Second Embodiment

Figure 7:
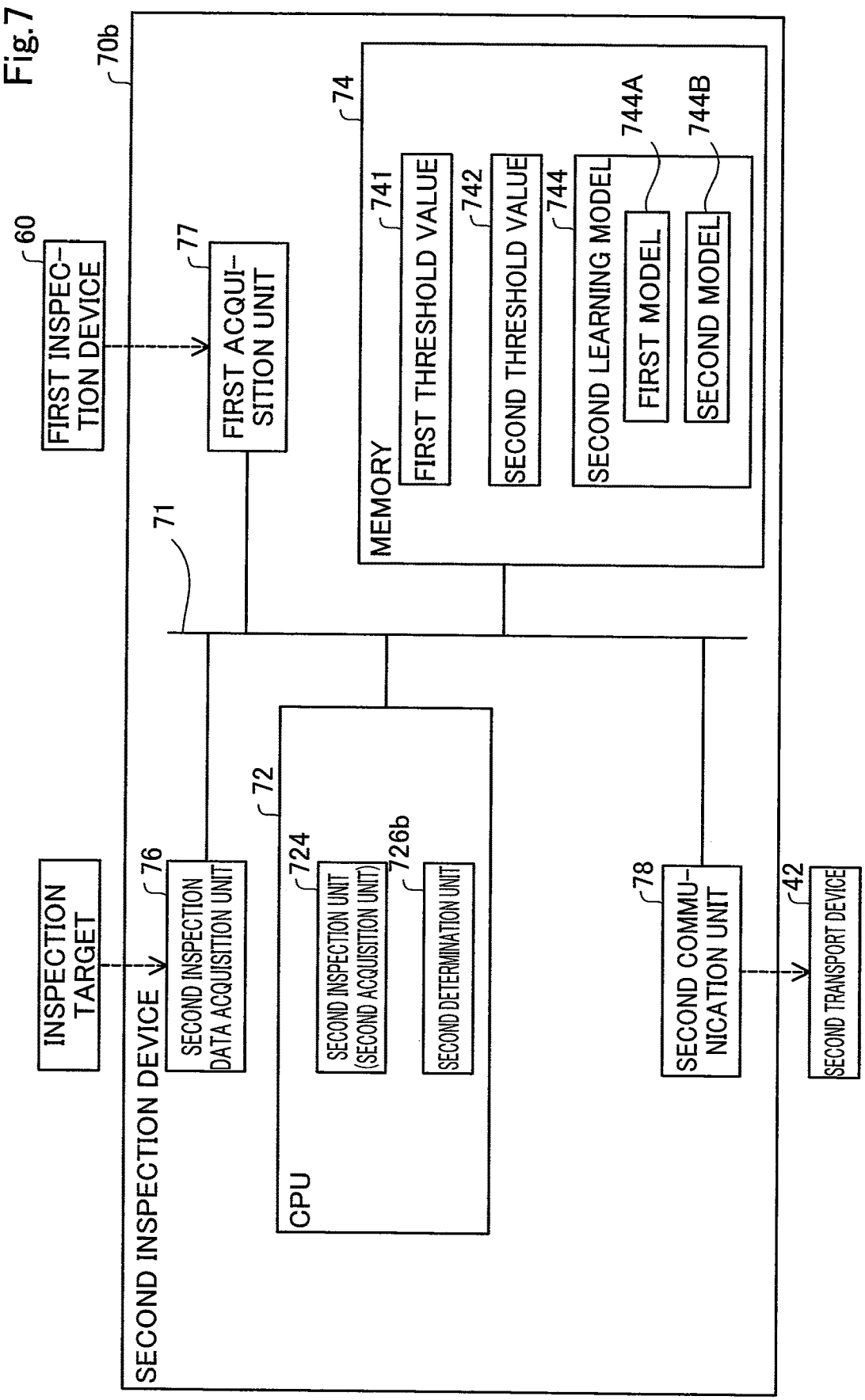
FIG. 7 is a block diagram illustrating an internal functional configuration of a second inspection device as a second embodiment.

FIG. 7 is a block diagram illustrating an internal functional configuration of a second inspection device 70b as a second embodiment. The second inspection device 70b of the second embodiment changes the inspection condition for the second inspection device 70b when the first defect probability is greater than the first threshold value 741. The second inspection device 70b differs from the second inspection device 70 of the first embodiment in that a first model 744A and a second model 744B are stored as the second learning model 744 and also that a second determination unit 726b is provided instead of the second determination unit 726, but other components of the second inspection device 70b are the same as those of the second inspection device 70 of the first embodiment.

The second determination unit 726b changes the inspection condition, unlike the second determination unit 726 of the first embodiment that changes the determination condition. Specifically, if the first defect probability is greater than the first threshold value 741, the second determination unit 726b changes the inspection condition using only the first model 744A of the second learning model 744 to an inspection condition using two learning models, namely, the first model 744A and the second model 744B of the second learning model 744 in the inspection by the second inspection unit 724. In the present embodiment, the first model 744A of the second learning model 744 is a CNN, and can employ, for example, the CNN using a VGG16. The second model 744B is a learning model that prioritizes the inspection accuracy for the inspection target over a processing time required to complete the calculation of the second defect probability, as compared with the first model 744A. According to the second model 744B, the detection accuracy for objects can be improved, and the calculation accuracy for the defect probability can be improved, compared to the first model 744A, resulting in higher inspection accuracy. In the present embodiment, the second model 744B is a Region-based CNN (R-CNN), and can employ, for example, an R-CNN YOLOv3. The R-CNN is not limited to the R-CNN or R-CNN YOLOv3, but may employ, for example, a Fast R-CNN, Faster R-CNN, YOLO, and the like. For example, the Faster R-CNN is preferably applied to the second model 744B because of its high inspection accuracy. For example, the YOLO (You Only Look Once) is preferably applied to the first model 744A because of its high processing speed. The first model 744A and the second model 744B of the second learning model 744 are not limited to the CNN model or the R-CNN model, but may use a Single Shot Detector (SSD) or may use discriminative models and generative models of various neural networks, such as a Generative Adversarial Network (GAN), a Variational Autoencoder (VAE), and an autoregressive generative network.

Figure 8:
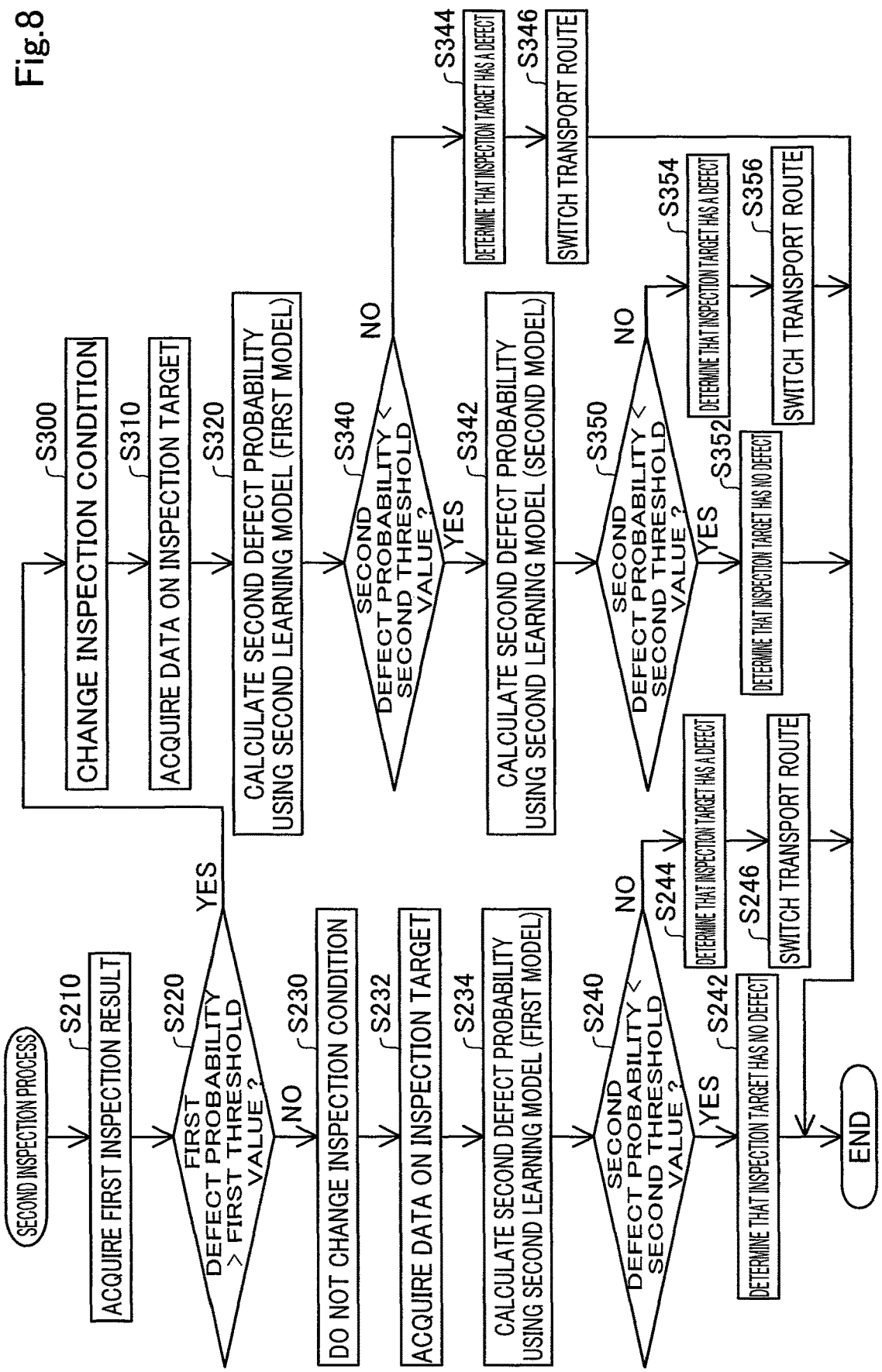
FIG. 8 is a process diagram illustrating the details of a second inspection process performed by the second inspection device of the second embodiment.

FIG. 8 is a process diagram illustrating the details of a second inspection process performed by the second inspection device 70b of the second embodiment. The second inspection process of the second embodiment differs from that of the first embodiment in that it includes steps S300 to S356, instead of steps S250 to S266. If the acquired first defect probability is greater than the first threshold value 741 (S220: YES) in step S220, the operation proceeds to processing in step S300. In step S300, the second determination unit 726b changes the inspection condition for the second inspection unit 724. Specifically, the second determination unit 726b changes the inspection condition using only the first model 744A of the second learning model 744 to the inspection condition for executing respective inspections using two learning models, namely, inspection using the first model 744A of the second learning mode 744 and inspection using the second model 744B thereof.

In step S310, the second inspection data acquisition unit 76 acquires data to be used for inspection. In the present embodiment, the camera as the second inspection data acquisition unit 76 captures an image of the product, thereby acquiring the image of the inspection target after the processing performed by the second manufacturing device 32. In step S320, the second inspection unit 724 calculates a second defect probability by inputting the acquired image data into a CNN-VGG16 as the first model 744A of the second learning model 744.

In step S340, the second determination unit 726b uses the second defect probability calculated by the second inspection unit 724 and the second threshold value 742 stored in the storage device 74 to determine whether the inspection target has a defect or not. In the present embodiment, the second threshold value 742 is set to 2.0%. If the second defect probability is greater than or equal to 2.0% (S340: NO), the operation proceeds to step S344, in which the second determination unit 726b determines that the inspection target has a defect. In step S346, the second determination unit 726b transmits to the second transport device 42, via the second communication unit 78, a command signal for switching the transport route to a route for dispatching the product to the second modification process.

If the second defect probability is less than 2.0% (S340: YES), the operation of the second determination unit 725 proceeds to step S342. In step S342, the second inspection unit 724 further calculates a defect probability using the second model 744B based on the changed inspection condition. Specifically, a new second defect probability is calculated by further inputting the acquired image data into the R-CNN YOLOv3 as the second model 744B. The new second defect probability means a second defect probability calculated using the second model 744B after being calculated using the first model 744A.

In step S350, the second determination unit 726b uses the new second defect probability calculated by the second inspection unit 724 and the second threshold value 742 to determine whether the inspection target has a defect or not. For example, the second value 742B may be used instead of the first value 742A when the first value 742A and the second value 742B are stored in the storage device 74 as the second threshold value 742 described in the first embodiment. If the new second defect probability is greater than or equal to 2.0% (S350: NO), the operation proceeds to step S354, in which the second determination unit 726b determines that the inspection target has a defect. In step S356, the second determination unit 726b transmits to the second transport device 42, via the second communication unit 78, a command signal for switching the transport route to a route for dispatching the product to the second modification process. If the new second defect probability is less than 2.0% (S350: YES), the operation proceeds to step S352, in which the second determination unit 726b determines that the inspection target has no defect. After the second determination unit 726b finishes the processing in steps S352, S356, and S346, the second inspection process is ended.

According to the second inspection device 70b of the present embodiment, the second determination unit 726b further changes the first model 744A to the second model 744B, which is the learning model with high inspection accuracy, after the second defect probability is calculated using the first model 744A of the second learning model 744 if the first defect probability is greater than the first threshold value 741. The second inspection unit 724 further calculates the new defect probability of the inspection target using the second model 744B. The second determination unit 726b changes the inspection condition for the second inspection unit 724 to the condition for performing inspection twice, namely, the inspection using the first model 744A as the second learning model 744 and the inspection using the second model 744B in a case where the product, after the processing in the second manufacturing process, may have a potential defect due to the first manufacturing process. Therefore, the inspection accuracy of the second inspection device 70b can be improved by changing the inspection condition to one using the second model 744B with high inspection accuracy. The inspection accuracy of the second inspection device 70b can be further improved by changing the inspection twice.

According to the second inspection device 70b of the present embodiment, the first model 744A is a CNN, and the second model 744B is an R-CNN. Therefore, the inspection accuracy of the second inspection device 70b can be improved by a simple method using the known learning model.

C. Other Embodiments (C1) In each of the above embodiments, the first manufacturing device 31 is, for example, a die casting machine, while the second manufacturing device 32 is, for example, a device that performs post-machining or post-processing on products after casting. In contrast, the first manufacturing device 31 and the second manufacturing device 32 are not limited to these examples but may be various types of equipment, such as a processing machine, a welding machine, a molding machine, and a painting machine.

(C2) The first manufacturing process and the second manufacturing process are not necessarily limited to those which are continuous with each other, but may include other processes interposed between the first and second manufacturing processes on the assumption that the first and second manufacturing processes are linked to each other. It is noted that the number of processes interposed between the first and second manufacturing processes is preferably small to the extent that the processing in the first manufacturing process affects the properties of the product after the processing in the second manufacturing process as the subsequent process. For example, the number thereof is preferably seven or less, and more preferably three or less.

(C3) In each of the above embodiments, the first inspection device 60 and the second inspection device 70 determine whether the inspection target has a defect or not by using the image data on the inspection target. The first inspection data acquisition unit 66 and the second inspection data acquisition unit 76 acquire the image of the inspection target as the data to be used for inspection. In contrast, the data to be used for inspection is not limited to images of products, but may be various parameters that the products have, such as temperature, dimensions, weight, color, and shape. The data to be used for inspection is not limited to product data, but may be non-product data based on the premise that it may affect the defect probability of the inspection target. The data to be used for inspection may be, for example, manufacturing conditions and parameters of devices included in the manufacturing line LP, such as voltage values, current values, pressure values, temperatures, displacement amounts, their waveforms and changes, processing times, etc. The first inspection data acquisition unit 66 and the second inspection data acquisition unit 76 are not limited to cameras, but may be various sensors such as light sensors, sound sensors, heat sensors, current sensors, voltage sensors, distance sensors, air pressure sensors, acceleration sensors, rotation speed sensors, humidity sensors, pressure sensors, and magnetic force sensors. Each sensor is a sensor that acquires data for calculating the defect probability of the inspection target. In cases where a device other than the first and second inspection data acquisition units 66 and 76 acquires data on the inspection target, such as when the first and second manufacturing devices 31 and 32 include cameras for capturing the image of the inspection target, the first and second inspection data acquisition units 66 and 76 may act as a communication device that acquires data for inspection from the device, other than the first and second inspection data acquisition units 66 and 76, via wireless communication or via wired communication.

(C4) In the above second embodiment, the second determination unit 726b changes the inspection condition for the second inspection unit 724 to the condition for performing inspection twice, namely, the inspection using the first model 744A as the second learning model 744 and the inspection using the second model 744B. On the other hand, if the acquired first defect probability is greater than the first threshold value 741, the second determination unit 726b may change the inspection condition for the second inspection unit 724 from the inspection condition using the first model 744A as the second learning model 744 to the inspection condition using only the second model 744B. In this case, in an example of FIG. 8, steps S32, S340, S344, and S346 can be omitted. According to the second inspection device 70b of this embodiment, the inspection accuracy of the second inspection device 70b can be improved by changing the inspection condition to one using the second model 744B with high inspection accuracy. Therefore, the detection accuracy of the second inspection device 70b can be improved when the product, after the processing in the second manufacturing process, may have a potential defect due to the first manufacturing process.

(C5) In each of the above embodiments, the second inspection unit 724 also functions as the second acquisition unit by way of example. Specifically, the second inspection unit 724 executes, for example, both the calculation of the second defect probability and the acquisition thereof. In contrast, in a case where the second defect probability is calculated by a device different from the second inspection device 70, such as the second manufacturing device 32, for example, the second acquisition unit may execute only acquisition of the second defect probability from the second manufacturing device 32 via wireless communication or wired communication without executing the calculation of the second defect probability.

The control unit and its method described in the present disclosure may be realized by a dedicated computer that is provided by configuring a processor and memory programmed so as to execute one or more functions embodied by a computer program. Alternatively, the control unit and its method described in the present disclosure may be realized by a dedicated computer that is provided by configuring a processor using one or more dedicated hardware logic circuits. Further, alternatively, the control unit and its method described in the present disclosure may be realized by one or more dedicated computers that are provided by combining a processor and memory programmed so as to execute one or more functions and another processor configured by one or more hardware logic circuits. The computer program may also be stored in a computer-readable, non-transitory tangible recording medium as instructions to be executed by the computer.

The present disclosure is not limited to the above-described embodiments, and can be realized with various configurations without departing from the spirit of the present disclosure. For example, the technical features in the embodiments may be replaced or combined as appropriate to solve some or all of the problems described above or to achieve some or all of the effects described above. Unless the technical feature is described herein as essential, it can be deleted as appropriate. For example, the present disclosure may be realized by embodiments described below.

(1) According to an aspect of the present disclosure, an inspection device is provided. The inspection device includes: a first acquisition unit configured to acquire a first defect probability, wherein the first defect probability is calculated using a first learning model, wherein data regarding an inspection target processed in a first manufacturing process is input into the first learning model; a second acquisition unit configured to acquire a second defect probability, wherein the second defect probability is calculated using a second learning model, wherein data regarding the inspection target processed in a second manufacturing process after the first manufacturing process is input into the second learning model; and a determination unit configured to determine that the inspection target has a defect when the acquired second defect probability is greater than or equal to a second threshold value, the determination unit being configured to change at least one of a condition of the second learning model and a condition of the second threshold value into a condition for enhancing inspection accuracy when the acquired first defect probability is greater than a predetermined first threshold, wherein the condition for enhancing inspection accuracy has higher accuracy compared to when the first defect probability is less than or equal to the first threshold value.

According to the inspection device of this aspect, the inspection condition is changed to the condition for enhancing the inspection accuracy if the first defect probability is greater than the first threshold value. Therefore, the inspection accuracy for a product after the processing in the second manufacturing process can be improved.

(2) In the inspection device of the above aspect, when the acquired first defect probability is greater than the first threshold value, the determination unit may not change the second learning model, but may change the second threshold value to a second value. The second value is smaller than a first value, and a first value is used when the first defect probability is less than or equal to the first threshold value. When the acquired first defect probability is less than or equal to the first threshold value, the determination unit may change neither the second learning model nor the second threshold value.

According to the inspection device of this aspect, the inspection accuracy of the second inspection device can be improved by setting the inspection condition for defects at the determination unit to be stricter.

(3) In the inspection device of the above aspect, when the acquired first defect probability is greater than the first threshold value, the determination unit may not change the second threshold value, but may change the second learning model to a second model. The second model is different from a first model, and the first model is used when the first defect probability is less than or equal to the first threshold value. When the acquired first defect probability is less than or equal to the first threshold value, the determination unit may change neither the second learning model nor the second threshold value.

According to the inspection device of this aspect, the calculation accuracy for the second defect probability can be improved, and the inspection accuracy of the second inspection device can be improved by changing the learning model as the inspection condition to the learning model with high inspection accuracy.

(4) In the inspection device of the above aspect, when the acquired first defect probability is greater than the first threshold value, the determination unit may determine whether the inspection target has a defect or not by using the second defect probability, and then may change the second learning model to a second model. The second model is different from a first model that is used when the first defect probability is less than or equal to the first threshold value. The second acquisition unit may further acquire the second defect probability. The second defect probability may be calculated using the second learning model that has been changed to the second model. The determination unit may further determine whether the inspection target has a defect or not by using the second defect probability calculated using the second learning model that has been changed to the second model. When the acquired first defect probability is less than or equal to the first threshold value, the determination unit may change neither the second learning model nor the second threshold value.

According to the inspection device of this aspect, the calculation accuracy for the second defect probability can be improved, and the inspection accuracy of the second inspection device can be improved by performing inspection twice and changing the learning model as the inspection condition to the learning model with high inspection accuracy.

(5) In the inspection device of the above aspect, the first model may be a CNN, and the second model may be an R-CNN.

According to the inspection device of this aspect, the inspection accuracy of the second inspection device can be improved by a simple method using the known learning model.

The present disclosure can also be realized in various forms other than the inspection device. For example, the present disclosure can be realized in the forms of an inspection method, a manufacturing method of the inspection device, a control method of the inspection device, a computer program for implementing the control method, a non-temporary recording medium having recorded the computer program, and the like.

What is claimed is:

1. An inspection device comprising a processor and a memory, the processor executing instructions stored in the memory and configured to:
    acquire a first defect probability, the first defect probability being calculated using a first learning model into which data regarding an inspection target processed in a first manufacturing process is input; and
    acquire a second defect probability, the second defect probability being calculated using a second learning model into which data regarding the inspection target processed in a second manufacturing process performed after the first manufacturing process is input, wherein
    (a) when the acquired first defect probability is less than or equal to a first threshold value, the processor determines that the inspection target has a defect when the acquired second defect probability is greater than or equal to a second threshold value, the second defect probability being calculated using a first model of the second learning model,
    (b) when the acquired first defect probability is greater than the first threshold value:
        (b1) the processor determines that the inspection target has a defect when the acquired second defect probability is greater than or equal to the second threshold value, the second defect probability being calculated using the first model of the second learning model,
        (b2) when the acquired second defect probability that was calculated using the first model of the second learning model is less than the second threshold value, the processor re-calculates the second defect probability using a second model of the second learning model, the second model being different from the first model, the second model having a higher accuracy than the first model, the first model having a higher processing speed than the second model, and
        (b3) the processor determines that the inspection target has a defect when the acquired second defect probability re-calculated using the second model is greater than or equal to the second threshold value.

2. The inspection device according to claim 1, wherein the first model is a Convolutional Neural Network (CNN), and the second model is a region-based CNN (R-CNN).

3. An inspection method performed by a processor executing instructions stored in a memory, the method comprising:
    acquiring a first defect probability, the first defect probability being calculated using a first learning model into which data regarding an inspection target processed in a first manufacturing process is input; and
    acquiring a second defect probability, the second defect probability being calculated using a second learning model into which data regarding the inspection target processed in a second manufacturing process performed after the first manufacturing process is input, wherein
    (a) when the acquired first defect probability is less than or equal to a first threshold value, the processor determines that the inspection target has a defect when the acquired second defect probability is greater than or equal to a second threshold value, the second defect probability being calculated using a first model of the second learning model,
    (b) when the acquired first defect probability is greater than the first threshold value:
        (b1) the processor determines that the inspection target has a defect when the acquired second defect probability is greater than or equal to the second threshold value, the second defect probability being calculated using the first model of the second learning model,
        (b2) when the acquired second defect probability that was calculated using the first model of the second learning model is less than the second threshold value, the processor re-calculates the second defect probability using a second model of the second learning model, the second model being different from the first model, the second model having a higher accuracy than the first model, the first model having a higher processing speed than the second model, and (b3) the processor determines that the inspection target has a defect when the acquired second defect probability re-calculated using the second model is greater than or equal to the second threshold value.

4. The inspection method according to claim 3, wherein the first model is a Convolutional Neural Network (CNN), and the second model is a region-based CNN (R-CNN).

\* \* \* \* \*